(12) United States Patent
Huang

(10) Patent No.: US 6,932,497 B1
(45) Date of Patent: Aug. 23, 2005

(54) SIGNAL LIGHT AND REAR-VIEW MIRROR ARRANGEMENT

(76) Inventor: Jean-San Huang, No. 345, Hsing Nan Street, Tainan City (TW)

( * ) Notice: Subject to any disclaimer, the term of this patent is extended or adjusted under 35 U.S.C. 154(b) by 64 days.

(21) Appl. No.: 10/740,357

(22) Filed: Dec. 17, 2003

(51) Int. Cl.[7] .............................. B60Q 1/26; B60R 1/12
(52) U.S. Cl. ...................... 362/494; 362/268; 362/336; 362/522; 362/540; 340/475
(58) Field of Search ................................. 362/268, 336, 362/487, 494, 520–522, 540; 340/485

(56) References Cited

U.S. PATENT DOCUMENTS

| | | | | |
|---|---|---|---|---|
| 2,263,382 A | * | 11/1941 | Gotzinger | 362/540 |
| 4,892,336 A | * | 1/1990 | Kaule et al. | 283/91 |
| 5,462,700 A | * | 10/1995 | Beeson et al. | 264/1.27 |
| 5,788,357 A | * | 8/1998 | Muth et al. | 362/494 |
| 6,246,530 B1 | * | 6/2001 | Matsuura | 359/719 |
| 6,250,783 B1 | * | 6/2001 | Stidham et al. | 362/494 |
| 6,749,325 B2 | * | 6/2004 | Bukosky et al. | 362/494 |
| 2003/0179584 A1 | * | 9/2003 | Pond et al. | 362/487 |
| 2005/0047160 A1 | * | 3/2005 | Evans | 362/494 |

* cited by examiner

*Primary Examiner*—Stephen Husar
*Assistant Examiner*—Jason Han
(74) *Attorney, Agent, or Firm*—Pro-Techtor International Services

(57) ABSTRACT

A signal light and rear-view mirror arrangement is constructed to include a circuit board mounted in the back recess of a vehicle rear-view mirror and adapted to control a set of lamps to flash, and a lens covered on the back side of the vehicle rear-view mirror, the lens having a plurality of raised portions protruded from the inner surface and forming a honeycomb-like condensing area adapted to condense and refract light from the lamps, a transparent area surrounding the honeycomb-like condensing area, and a photomask covered on the outer surface of the lens corresponding to the condensing area.

4 Claims, 6 Drawing Sheets

SIGNAL LIGHT AND REAR-VIEW MIRROR ARRANGEMENT

BACKGROUND OF THE INVENTION

1. Field of the Invention

The present invention relates to a signal light and rear-view mirror arrangement and, more specifically, to technique of improving the indication of the signal light of a vehicle rear-view mirror.

2. Description of the Related Art

A rear-view mirror signal light assembly A is shown comprising a plurality of lamps (for example, light emitting diodes) 101 installed in a recess 102 at the back side of an automobile's rear-view mirror 100, and a lens 200 fastened to the recess 102 and covered over the lamps 101. The lamps 101 are driven to flash subject to the operation of the directional signal lamps of the motor vehicle. This design of rear-view mirror signal light assembly A is still not satisfactory in function. During flashing of the lamps 101, light from the lamps 101 is dispersed in all directions through the lens 200, weakening the indication of the signal light.

SUMMARY OF THE INVENTION

The present invention has been accomplished under the circumstances in view. It is the main object of the present invention to provide a signal light and rear-view mirror arrangement, which condenses and refracts light from the lamps, producing a high intensity of light for indication.

To achieve this and other objects of the present invention, the signal light and rear-view mirror arrangement comprises a rear-view mirror, the rear-view mirror having a recess in a back side thereof, a lens fastened to the back side of the rear-view mirror and covered over the recess, a circuit board provided in between the recess and the lens and electrically connected to the power circuit of the directional signal lights of an automobile, and a plurality of lamps mounted in the circuit board and controlled to flash by the circuit board, wherein the lens has a plurality of raised portions protruded from an inner surface thereof, the raised portions forming a honeycomb-like condensing area adapted to condense and refract light from the lamps, a transparent area surrounding the honeycomb-like condensing area, and a photomask covered on an outer surface thereof corresponding to the condensing area outside the transparent area.

DETAILED DESCRIPTION OF THE PREFERRED EMBODIMENT

Figure 1:
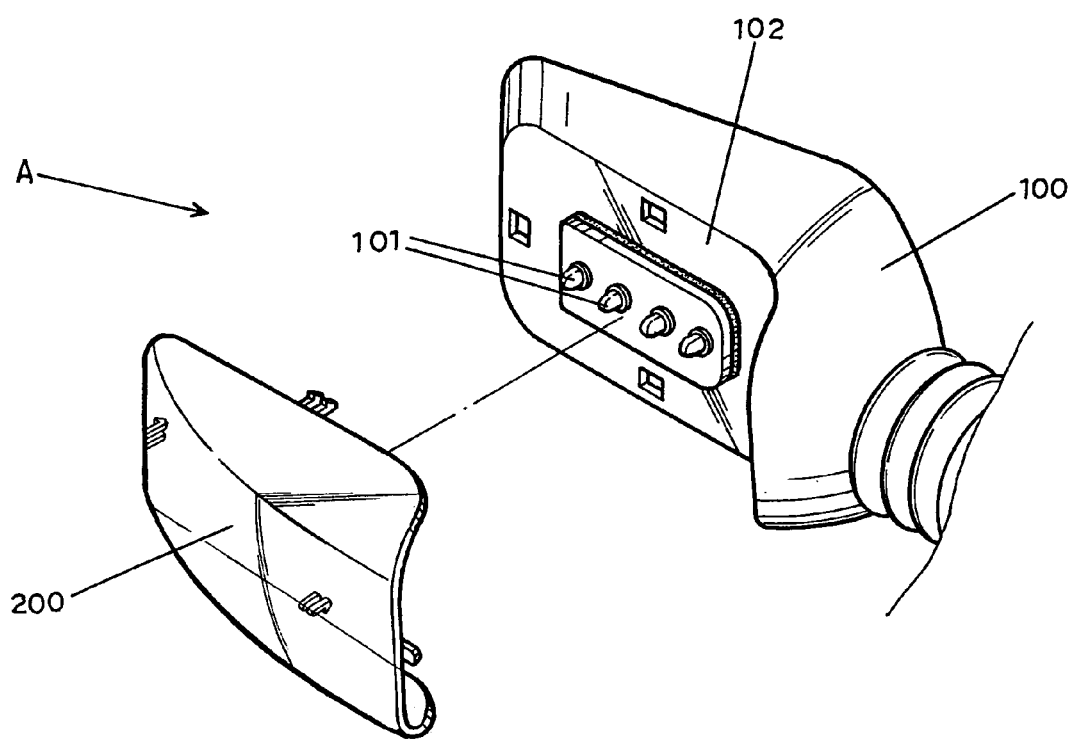
FIG. 1 is an exploded view of a signal light and rear-view mirror arrangement according to the prior art.
Figure 2:
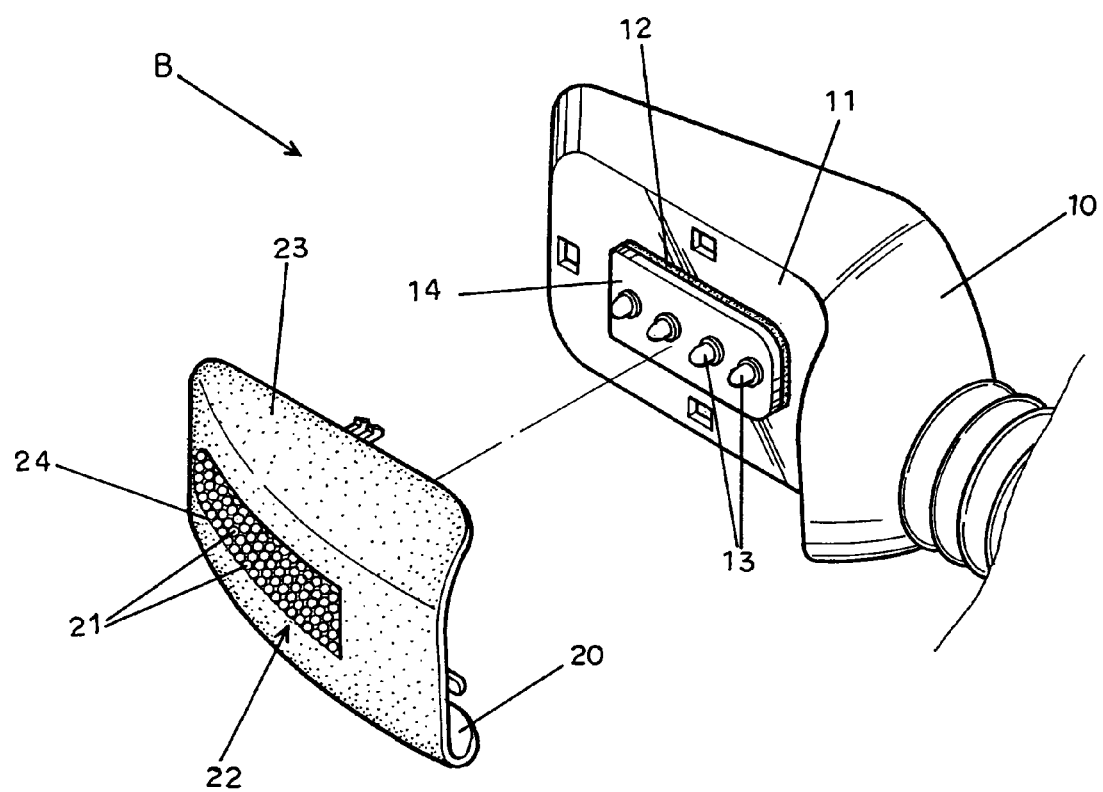
FIG. 2 is an exploded view of a signal light and rear-view mirror arrangement according to the present invention.
Figure 3:
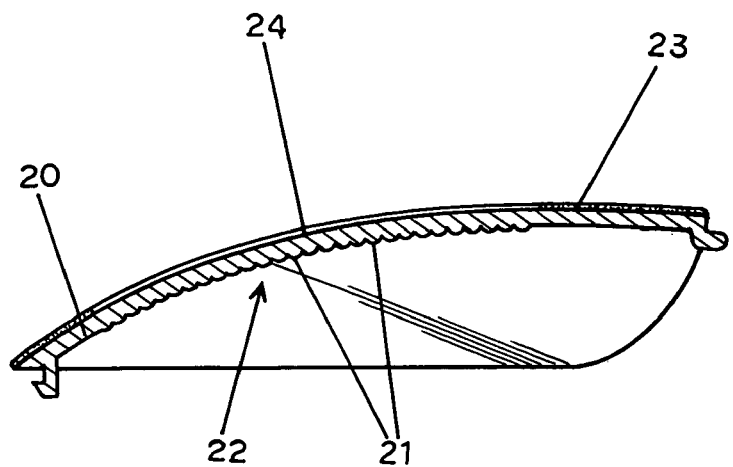
FIG. 3 is a sectional view of the lens for the signal light and rear view mirror arrangement according to the present invention.

Referring to FIGS. 2 and 3, a signal light assembly B is installed in a recess 11 at the back side of an automobile's rear-view mirror 10. The signal light assembly B comprises a circuit board 14 affixed to the recess 11 by a bonding pad 12, a plurality of lamps, for example, LEDs (light emitting diodes) 13 mounted in the circuit board 14, and a lens 20 fastened to the recess 11 and covered over the circuit board 14. The circuit board 14 has an electric wire 15 extended through the rear-view mirror 10 (see FIGS. 4 and 6) and electrically connected to the power circuit of the directional signal lights of the automobile (not shown). The LEDs 13 are controlled to flash by the circuit board 14, providing a visual signal to the outside through the lens 20.

The main feature of the invention is outlined hereinafter with reference to FIG. 3. As illustrated, the lens 20 has a plurality of raised portions 21 protruded from the inner surface, forming a honeycomb-like condensing area 22, and a photomask 23 covered on the outer surface corresponding to the condensing area 22. The other area of the lens 20 outside the condensing area 22 is the transparent area 24, which surrounds the condensing area 22.

When operating the directional signal lights of the automobile, the circuit board 14 is driven to flash the LEDs 13, and the flashing light is condensed and refracted by the raised portions 21 of the honeycomb-like condensing area 22 and then transmitted to the outside through the transparent area 24 (see FIG. 4), giving a visual warning signal to passers-by and motor vehicles coming from the front side.

Figure 5:
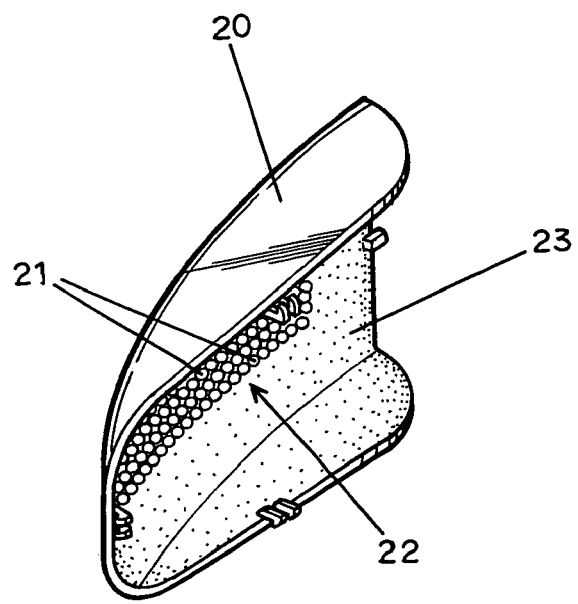
FIG. 5 is an elevational view of an alternate form of the lens for the signal light and rear-view mirror arrangement according to the present invention.
Figure 6:
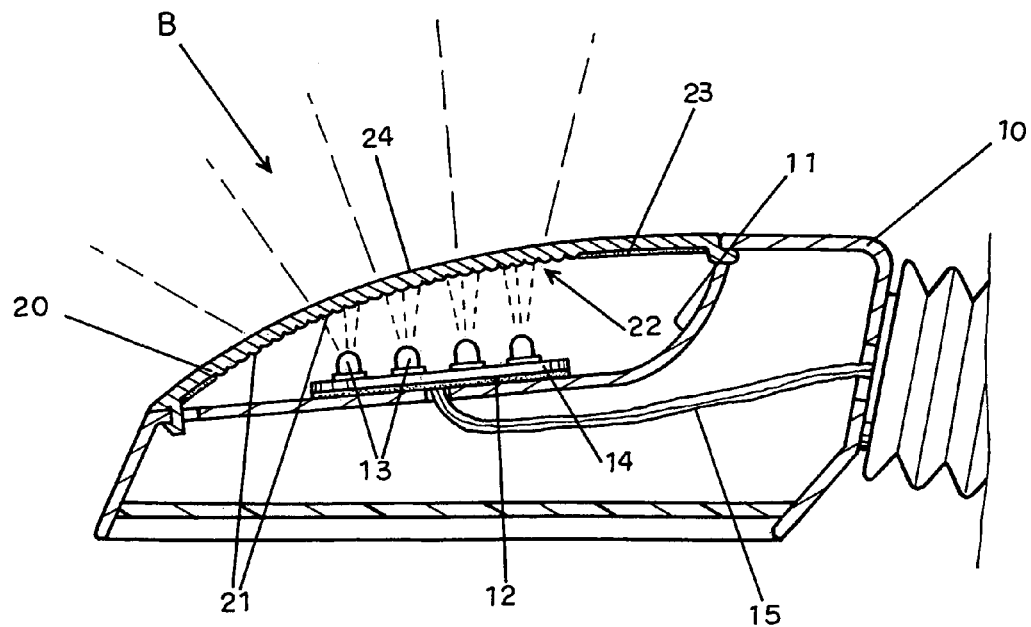
FIG. 6 is a sectional assembly view of an alternate form of the present invention, showing the lens of FIG. 5 used.

FIGS. 5 and 6 show an alternate form of the present invention. According to this embodiment, the lens 20 has a plurality of raised portions 21 protruded from the inner surface, forming a honeycomb-like condensing area 22, and a photomask 23 covered on the inner surface around the condensing area 22. The area of the outer surface of the lens 20 corresponding to the honeycomb-like condensing area 22 forms a transparent area 24. The condensing area 22 condenses and refracts light from the LEDs 13, for enabling condensed and refracted light to pass to the outside through the transparent area 24.

The photomask 23 may be covered on a part of the condensing area 22 to reduce the transparent area 24. When the light of the LEDs 13 is passing through the reduced transparent area 24, a high intensity of visual signal is seen from the outside.

Figure 7:
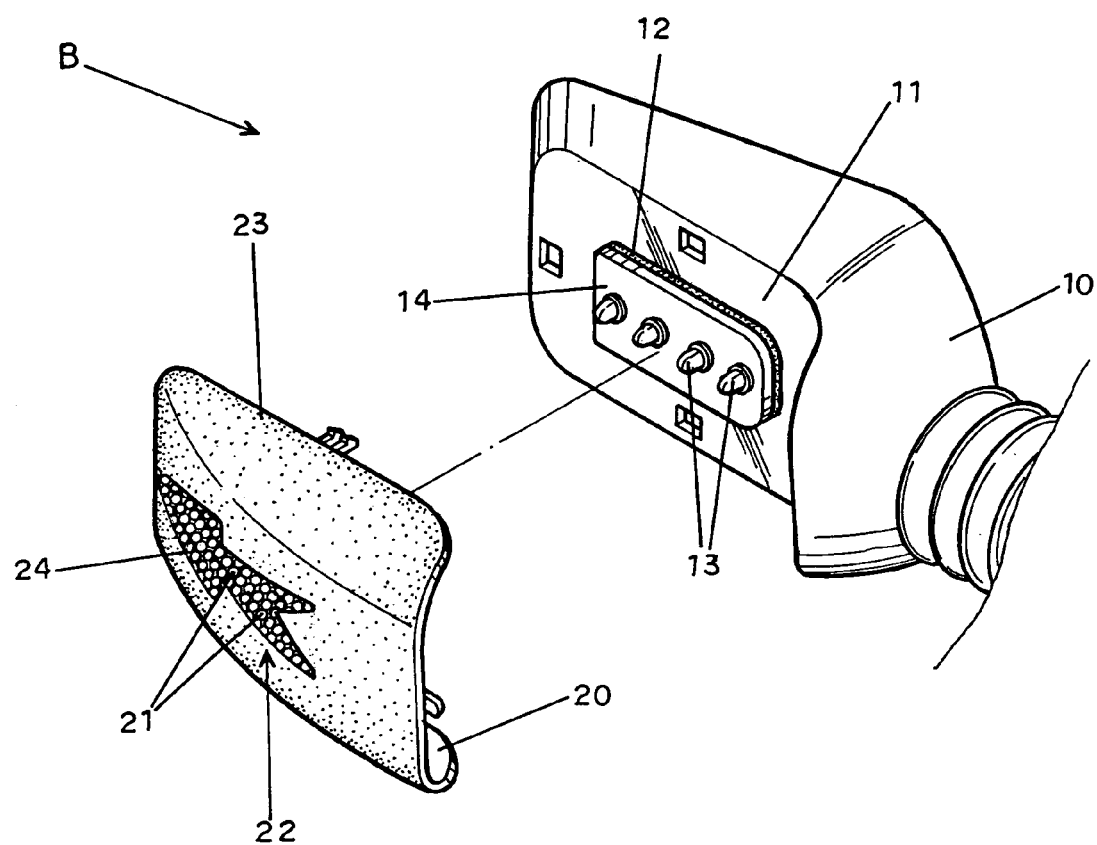
FIG. 7 is similar to FIG. 2 but showing a different pattern of the transparent area.

The transparent area 24 can have the shape of an arrowhead (see FIG. 7) or any of a variety of patterns.

Figure 4:
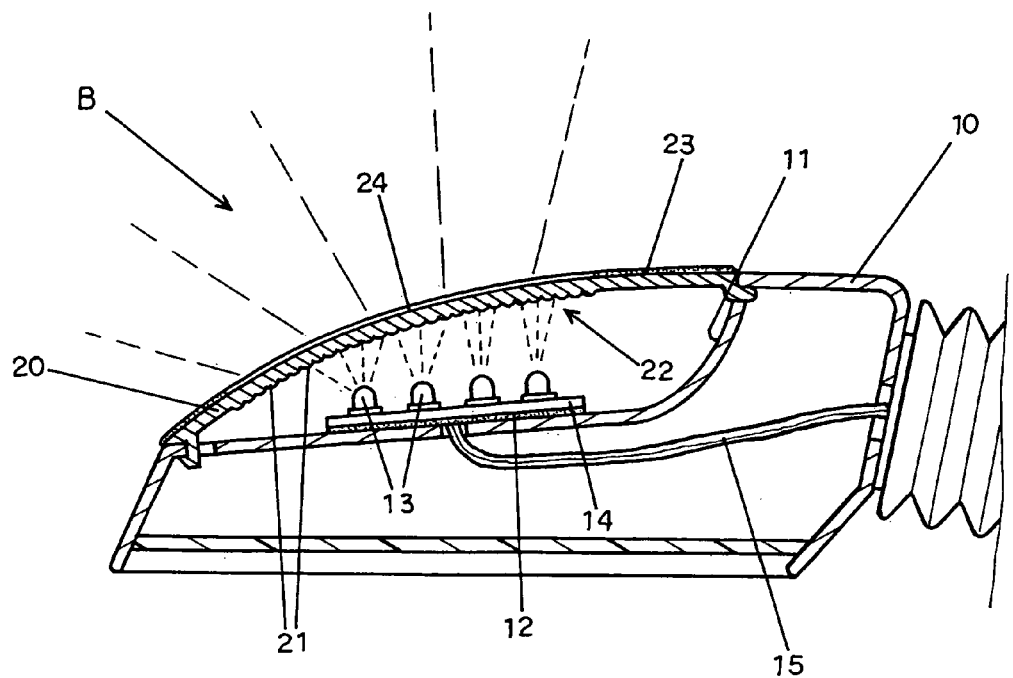
FIG. 4 is a sectional assembly view of the signal light and rear view mirror arrangement according to the present invention.
Figure 8:
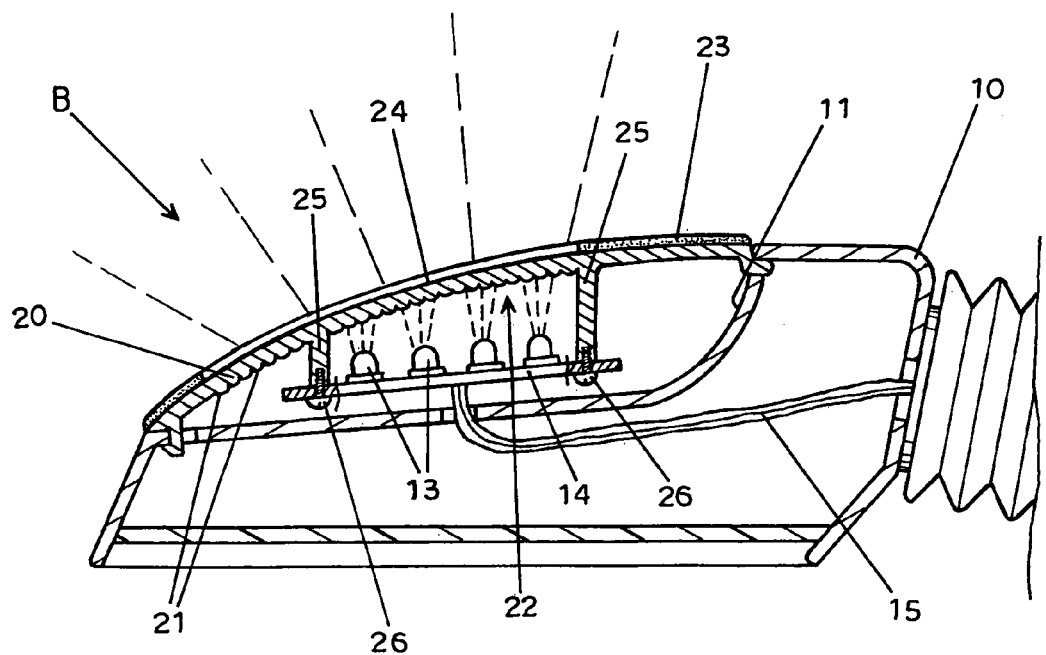
FIG. 8 is similar to FIG. 4 but showing a different mounting design of the circuit board.
Figure 9:
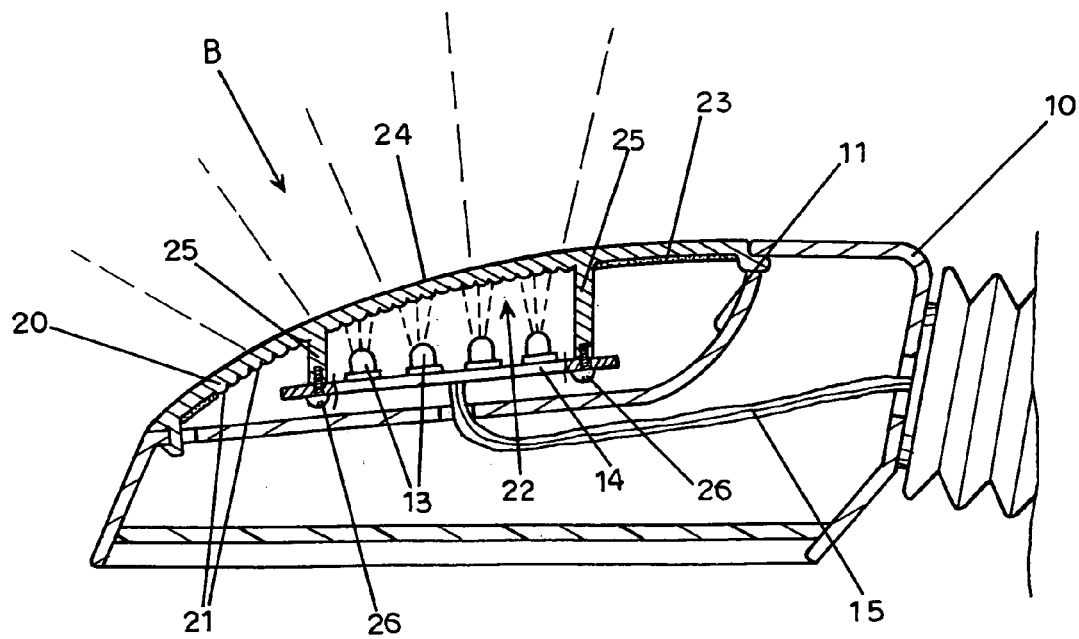
FIG. 9 is similar to FIG. 6 but showing a different mounting design of the circuit board.

According to the embodiments shown in FIGS. 4 and 6, the LEDs 13 are provided between the recess 11 and the lens 20. FIGS. 8 and 9 show a different mounting arrangement of the LEDs 13. As illustrated, the lens 20 has two back posts 25 perpendicularly extended from the inner surface, and the circuit board 14 is fastened to the back posts 25 with screws 26 to hold the LEDs 13 between the recess 11 and the lens 20.

As indicated above, the light of the LEDs 13 of the signal light assembly B is blocked by the photomask 23, and concentrated onto the transparent area 24 after having been condensed and refracted by the raised portions 21 of the honeycomb-like condensing area 22, giving a high intensity of visual signal to the outside.

A prototype of signal light and rear-view mirror arrangement has been constructed with the features of FIGS. 2~9. The signal light and rear-view mirror arrangement functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A signal light and rear-view mirror arrangement comprising a rear-view mirror, said rear-view mirror having a recess in a back side thereof, a lens fastened to the back side of said rear-view mirror and covered over said recess, a circuit board provided in between said recess and said lens and electrically connected to the power circuit of the directional signal lights of an automobile, and a plurality of lamps mounted in said circuit board and controlled to flash by said circuit board;

wherein said lens has a plurality of raised portions protruded from an inner surface thereof, said raised portions forming a honeycomb-like condensing area adapted to condense and refract light from said lamps, a transparent area surrounding said honeycomb-like condensing area, and a photomask covered on an outer surface thereof corresponding to said condensing area outside said transparent area.

2. The signal light and rear-view mirror arrangement as claimed in claim 1, wherein said photomask covers a part of said honeycomb-like condensing area.

3. A signal light and rear-view mirror arrangement comprising a rear-view mirror, said rear-view mirror having a recess in a back side thereof, a lens fastened to the back side of said rear-view mirror and covered over said recess, a circuit board provided in between said recess and said lens and electrically connected to the power circuit of the directional signal lights of an automobile, and a plurality of lamps mounted in said circuit board and controlled to flash by said circuit board;

wherein said lens has an inner surface, an outer surface, a plurality of raised portions protruded from said inner surface, said raised portions forming a honeycomb-like condensing area adapted to condense and refract light from said lamps, a photomask covered on said inner surface and surrounding said honeycomb-like condensing area, and a transparent area formed in said outer surface corresponding to said honeycomb-like condensing area.

4. The signal light and rear-view mirror arrangement as claimed in claim 3, wherein said photomask covers a part of said honeycomb-like condensing area.

* * * * *